United States Patent
Ben-Horin et al.

(10) Patent No.: US 10,140,038 B2
(45) Date of Patent: Nov. 27, 2018

(54) UTILIZATION OF A THIN PROVISION GRID STORAGE ARRAY

(71) Applicant: International Business Machines Corporation, Armonk, NY (US)

(72) Inventors: Yuval Ben-Horin, Houston, TX (US); Ehood Garmiza, Neve Ziv (IL); Itzhack Goldberg, Hadera (IL); Michael Keller, Haifa (IL); Rivka M. Matosevich, Zichron-Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 15/357,179

(22) Filed: Nov. 21, 2016

(65) Prior Publication Data
US 2018/0143775 A1    May 24, 2018

(51) Int. Cl.
*G06F 3/00* (2006.01)
*G06F 3/06* (2006.01)

(52) U.S. Cl.
CPC .......... *G06F 3/0619* (2013.01); *G06F 3/0644* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 8,880,801 B1* | 11/2014 | Robins | G06F 12/0246 711/114 |
| 2006/0242380 A1* | 10/2006 | Korgaonkar | G06F 3/0608 711/170 |
| 2013/0091282 A1* | 4/2013 | Tontiruttananon | G06F 9/5061 709/226 |
| 2014/0019706 A1 | 1/2014 | Kanfi | |
| 2014/0310457 A1* | 10/2014 | Chambliss | G06F 3/0665 711/114 |

OTHER PUBLICATIONS

IBM, "Virtual Storage Management", (online), printed from the web on Oct. 5, 2015, IBM Knowledge Center, Total 2 pages.

\* cited by examiner

*Primary Examiner* — David Yi
*Assistant Examiner* — Craig S Goldschmidt
(74) *Attorney, Agent, or Firm* — Janaki K. Davda; Konrad, Raynes, Davda and Victor LLP

(57) ABSTRACT

Provided are a computer program product, computer system, and method for utilization of a thin provision grid storage array. Storage devices are divided into a plurality of slices, wherein each of the slices has a same number of partitions. Volumes in a pool are configured, wherein the pool is associated with physical capacity of a slice, wherein a volume size is unlimited, and wherein a cumulative size of all volumes in the pool is unlimited. While data is being written to the volumes in the pool, partitions of a first slice of the plurality of slices are allocated to the volumes in the pool and, in response to determining that the first slice needs additional physical capacity, allocating a partition of a second slice to the first slice by updating a mapping table.

15 Claims, 9 Drawing Sheets

300

| Slice Identifier | Partition Identifier | Volume Identifier |
|---|---|---|
| 1 | 1 | A |
| 1 | 2 | B |
| 2 | 1 | C |
| 2 | 2 | |

| Slice Identifier | Partition Identifier | Volume Identifier |
|---|---|---|
| 1 | 1 | A |
| 1 | 2 | B |
| 2 | 1 | C |
| 1 | 3 | D |

FIG. 3B

UTILIZATION OF A THIN PROVISION GRID STORAGE ARRAY

BACKGROUND OF THE INVENTION

1. Field of the Invention

Embodiments of the present invention relate to a computer program product, computer system, and method for improved utilization of a thin provision grid storage array.

2. Description of the Related Art

Virtual memory is a technique that allows programs to use memory that is addressable with logical addresses, without considering the size of physical memory on the computer. That is, with virtualization, typically, some set amount of addressable memory may be used that is then mapped to physical addresses of physical storage. For example, the addressable memory may be defined as 10 times the physical storage. However, the same freedom of use does not exist for storage volumes ("volumes").

A virtual memory solution allows the use of more virtual memory than existing physically memory on a computing machine, which allows for the use of practically unlimited logical addressing of that physical memory. However, using more memory than actually exists typically backs the excess virtual memory via a swap space on a slower medium. This may not be appropriate for real-time programs, where predictable performance is important. On the other hand, real time programs still use the addressability of virtual memory to simplify programming.

Thin provisioning solutions for storage are focused on limiting the utilization of the virtual storage to capacity that either exists or may be added. The purpose of virtualization in these cases is to allow volumes to utilize the underlying storage more effectively, either by sharing resources, or via data reduction (compression or deduplication). In addition, many storage implementations use resources, such as metadata (e.g., bitmaps) or operations (Central Processing Unit (CPU)), proportional to the addressable space of the volumes, and, therefore, are limited in the virtual size of the volumes they can support.

Some systems divide disks into slices of even sizes. In some cases, certain slices are overused and other slices are under used. However, in such cases, the grid storage array was considered completely used up even though there were plenty of unused partitions (in under used slices) free.

Thus, there are "allocated" or "written" partitions that have been used and cannot be written to further, and there are "unallocated" or "free" partitions that may be allocated for writing new data.

To address that issue a volume offset was introduced to mitigate the hot-slice issue as well as making the number of slices as a prime number. Theoretically, one can have an environment where there can still be hot slices and even if the virtual maximum storage space is unlimited, and the physical one exhausted. The more volumes there are, the more chances for such hot slices to impact the system. A hot slice may be described as one which is used often. If the hot slice is used for writing new data, then the free partitions number for the hot slice will be decreased (as the partitions are being written to).

Thus if many snapshots (copies of data) are written to partitions belonging to a limited group of slices, those slices are filled up with allocated partitions and have less than the average number of free partitions.

SUMMARY

Provided is a computer program product for utilization of a thin provision grid storage array. the computer program product comprises a computer readable storage medium having computer readable program code embodied therein that executes to perform operations, the operations comprising: dividing storage devices into a plurality of slices, wherein each of the slices has a same number of partitions; configuring volumes in a pool, wherein the pool is associated with physical capacity of a slice, wherein a volume size is unlimited, and wherein a cumulative size of all volumes in the pool is unlimited; and, while data is being written to the volumes in the pool, allocating partitions of a first slice of the plurality of slices to the volumes in the pool and, in response to determining that the first slice needs additional physical capacity, allocating a partition of a second slice to the first slice by updating a mapping table.

Provided is a computer system for utilization of a thin provision grid storage array. The computer system comprises one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform operations comprising: dividing storage devices into a plurality of slices, wherein each of the slices has a same number of partitions; configuring volumes in a pool, wherein the pool is associated with physical capacity of a slice, wherein a volume size is unlimited, and wherein a cumulative size of all volumes in the pool is unlimited; and, while data is being written to the volumes in the pool, allocating partitions of a first slice of the plurality of slices to the volumes in the pool and, in response to determining that the first slice needs additional physical capacity, allocating a partition of a second slice to the first slice by updating a mapping table.

Provided is a method for utilization of a thin provision grid storage array. The method comprises dividing, using a processor of a computer, storage devices into a plurality of slices, wherein each of the slices has a same number of partitions; configuring volumes in a pool, wherein the pool is associated with physical capacity of a slice, wherein a volume size is unlimited, and wherein a cumulative size of all volumes in the pool is unlimited; and, while data is being written to the volumes in the pool, allocating partitions of a first slice of the plurality of slices to the volumes in the pool and, in response to determining that the first slice needs additional physical capacity, allocating a partition of a second slice to the first slice by updating a mapping table.

BRIEF DESCRIPTION OF THE DRAWINGS

FIG. 3A illustrates details of a mapping table when slices have a same size in accordance with certain embodiments.

FIG. 3B illustrates details of a mapping table when slices have different sizes in accordance with certain embodiments.

DETAILED DESCRIPTION

Figure 1:
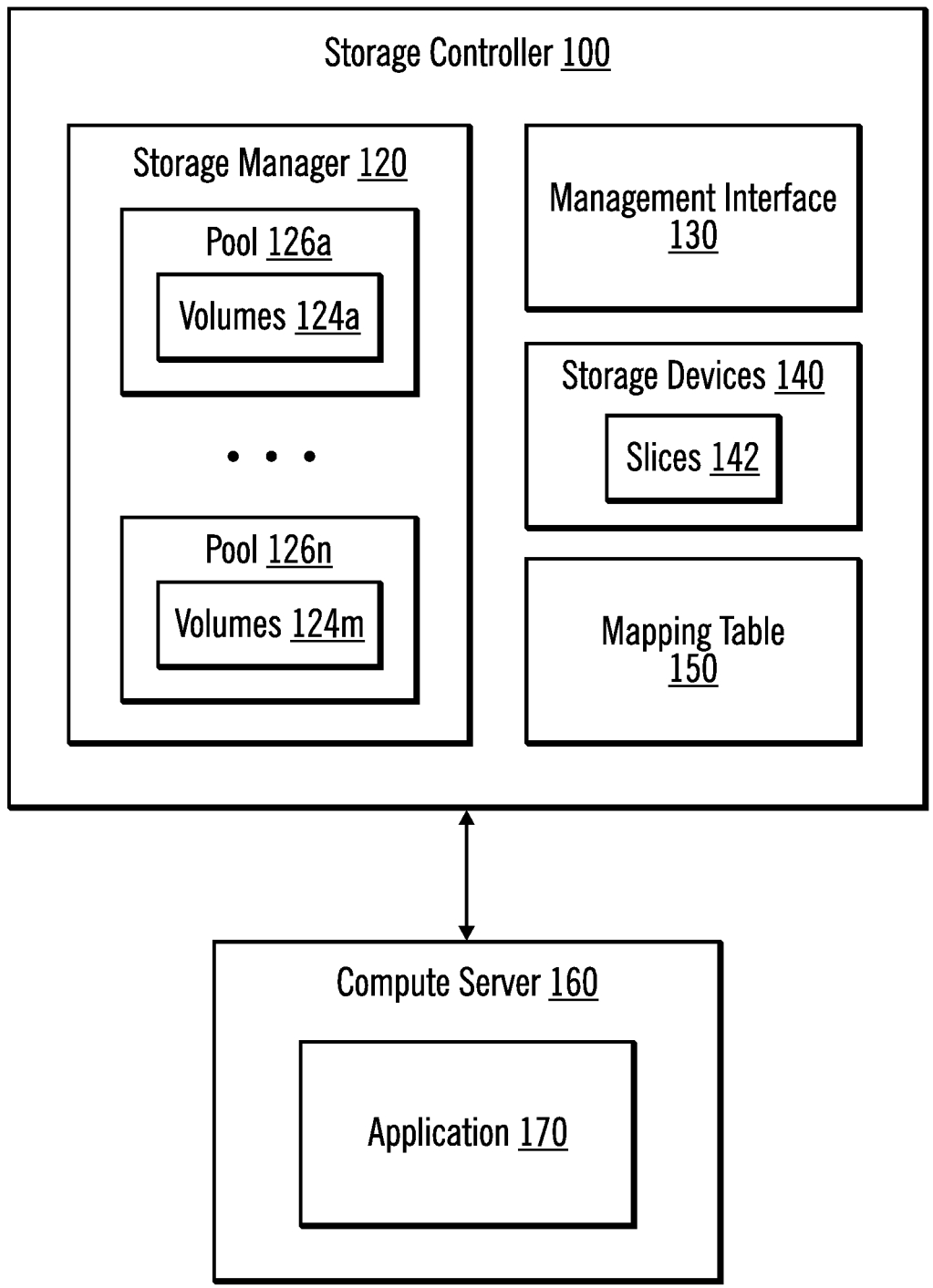
FIG. 1 illustrates, in a block diagram, a computing environment in accordance with certain embodiments.

FIG. 1 illustrates, in a block diagram, a computing environment in accordance with certain embodiments. A storage controller 100 is coupled to a compute server 160. The storage controller 100 includes a storage manager 120, a management interface 130, storage devices 140, and mapping tables 150. In certain embodiments, the storage devices 140 may be disks, Solid State Drives (SSDs), flash drives, etc.

The storage devices are divided into slices 142. For example, the storage devices 140 may be 180 disks, and there may be 16,000 slices. Initially, the slices 142 are the same size, but embodiments allow for the slices to change sizes (e.g., with one slice increasing in size, while one or more other slices decrease in size).

The storage devices 140 may form a grid storage array. A grid storage array may be described as one in which all data of all volumes is spread across all underlying storage devices. The storage devices may be grouped into modules that host those storage devices. A grid storage array is most efficiently used when all data is spread more or less evenly across the whole grid storage array and, in doing so, evenly utilizes the grid storage array modules' space, interconnect and compute power. This kind of architecture is different than the legacy storage arrays in which volumes reside on a few disks and, if those volumes are heavily used, those disks are overused, while other disks, whose volumes are less frequently used, are hardly used.

The storage manager 120 manages data stored in the volumes 124a . . . 124m The volumes 124a . . . 124m may be described as virtual storage volumes with addressable space. Addressable space may also be referred to as address space, addressing space, logical space/capacity or soft space/capacity. The compute server 160 includes at least one application 170 that writes data to one or more of the volumes 124a . . . 124m. In certain embodiments, some monitoring of the physical capacity and handling of errors when the physical capacity is out may be performed by one or more elements of the compute server operating system.

With embodiments, the storage devices 140 may be accessed with physical addresses, while the volumes 124a . . . 124m may be accessed with logical addresses. When an operation from the application 170 writes data to a logical address, the storage manager 120 maps the logical address to a physical address using mapping tables 150 and writes the data to the physical address of a storage device 140.

The volumes 124a . . . 124m may be grouped into different pools In certain embodiments, the pools 126a . . . 126n and volumes 124a . . . 124m may be configured by a system administrator or other user. In certain embodiments, the pools 126a . . . 126n are an optional object, and there may be embodiments in which the pools 126a . . . 126n are not defined (and so physical capacity is not divided to 126a . . . 126n). However, the ability to define pools 126a . . . 126n with some configured physical capacity allows the limiting of a physical capacity used by an application even when the virtual capacity of the volumes 124a . . . 124m is not limited.

Figure 2:
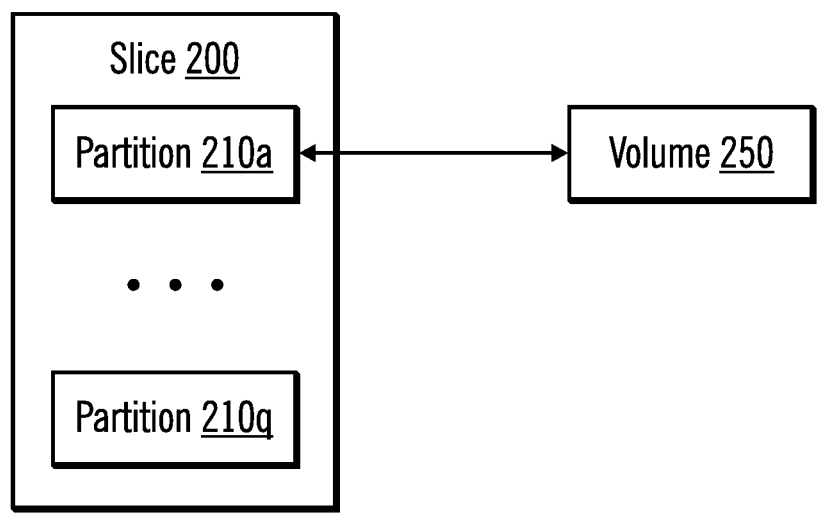
FIG. 2 illustrates a relationship between slices, partitions, and volumes in accordance with certain embodiments.

FIG. 2 illustrates a relationship between slices, partitions, and volumes in accordance with certain embodiments. For example, slice 200 includes partitions 210a . . . 210q. Partitions are allocated to volumes. For example, in FIG. 2, partition 210a is allocated to volume 250. Thus, volume 250 writes data to partition 210a of slice 200. With embodiments, the number of partitions in a slice may grow or shrink when the number of modules and storage devices 140 increase or decrease. With embodiments a slice is chosen for a given write for a volume based on a Logical Block Address (LBA). For example, a slice may be calculated by: slice=LBA % 16411.

With embodiments, the maximum size a slice can reach is when the grid storage array has all its modules and disks. For example, for a grid storage array having 15 modules, with each of the modules hosting 12 disks, then all disks in a given module are the same size initially (e.g., 2, 4 or 6 TerraByte (TB) disks).

Suppose that there is a volume with a minimum volume size. For this example, the minimum volume size is a 17 GigaByte (GB) volume=~(16411*1 MegaByte (MB)). The first partition in that volume resides in a slice that is mapped to that volume offset. For this example, the volume starts in slice n (where 0>n<16411). The next partition of that volume resides in slice n+1, the next partition resides in slice n+2, etc.

Any volume may be sparsely populated. This means that, although the volume is 17 GB in size, the amount of used space (i.e., space that is written to) is smaller, as there are gaps in the volume where its logical partitions are skipped. With this example, data is written only to LBAs 0, 16411, 32822 and each newly written logical partition LBA conforms to 16411*m formula. That way, only slice n allocates physical partitions to the volume will be slice n (remember slice=LBA %16411 [where % operator is the modulo operator]).

FIG. 3A illustrates details of a mapping table 300 when slices have a same size in accordance with certain embodiments. In FIG. 3A, the mapping table 300 shows that slice 1 and slice two each have two partitions. That is, the slices are the same size. Slice 1, Partition 1 stores Volume A; Slice 1, Partition 2 stores Volume B; and Slice 2, Partition 1 stores Volume C. Slice 2, Partition 2 does not store any volumes.

FIG. 3B illustrates details of a mapping table 310 when slices have different sizes in accordance with certain embodiments. With FIG. 3B, the mapping table 310 increases the size of Slice 1 by allocating the unused Partition 2 of Slice 2 to Slice 1. Thus, in table 310, the last row shows that the original Slice 2, Partition 2 is now Slice 1, Partition 3. Thus, Slice 1 has three partitions, while Slice 2 has one partition. Of course, this is a very simple example that is provided merely to enhance understanding.

Figure 4:
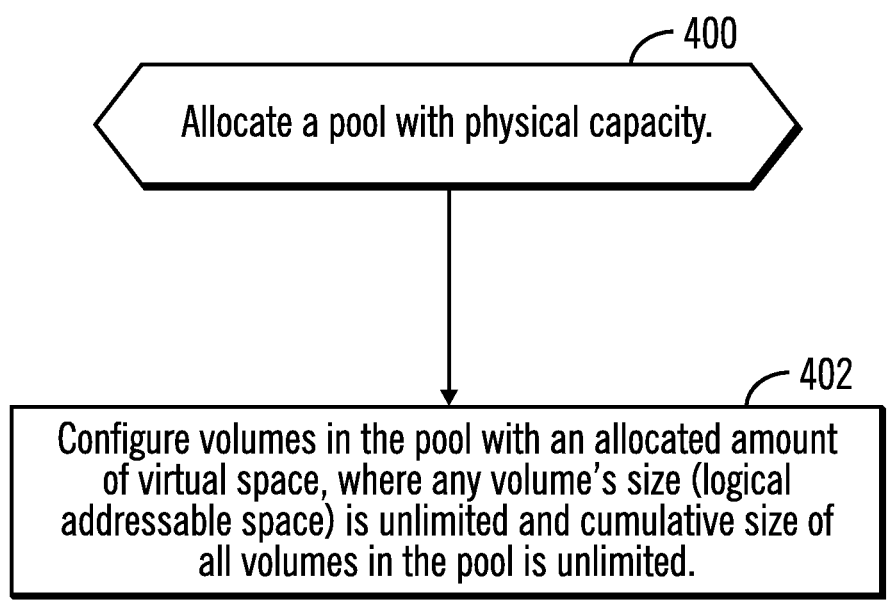
FIG. 4 illustrates, in a flow diagram, operations for configuration in accordance with certain embodiments.

FIG. 4 illustrates, in a flow diagram, operations for configuration in accordance with certain embodiments. Control begins at block 400 with the management interface 130 allocating a pool with physical capacity. In certain embodiments, the allocation is in response to a request to do so from a system administrator or other user. In certain embodiments, the allocated physical capacity is as some portion of the entire physical capacity of the storage devices 140 (e.g., 10 terabytes). In certain embodiments, each application may be associated with a pool and have the volumes used by the application configured in the pool with which the application is associated. In certain embodiments, the application and volumes and pools may be associated with departments and people. Then, one or more applications associated with that pool, may read and write to volumes associated with that pool, and as the volumes are written to, they use up to the allocated physical capacity. Thus, the applications indirectly use the allocated physical capacity. In certain embodiments, as the allocated physical capacity is used up, data may be deleted or more physical capacity may be allocated. With embodiments, the physical capacity is allocated without allocating specific storage devices. In other embodiments, specific storage devices may be allocated when allocating the physical capacity.

A thinly provisioned volume is another type of volume. In certain embodiments, for a thinly provisioned volume, the volume either does not get allocated any physically available space, in which case it can use any of the pool physical capacity, or the volume is allocated some physical capacity and is then limited to that portion of the entire physical capacity. In certain embodiments, a specific physical location or locations are assigned to application data, either when the volume is configured, when the data is written to the storage controller or when the data is destaged from the storage controller cache to the storage devices.

In block 402, the management interface 130 configures volumes in the pool, where a volume size (also referred to as addressable space) is unlimited and a cumulative size of all volumes in the pool is unlimited. In certain embodiments, the size of a volume is limited by the address size.

In certain embodiments, the management interface 130 tracks the amount of physical capacity used by a pool and provides a User Interface (UI) to receive requests to display the amount of physical capacity used by the pool.

Figure 5:
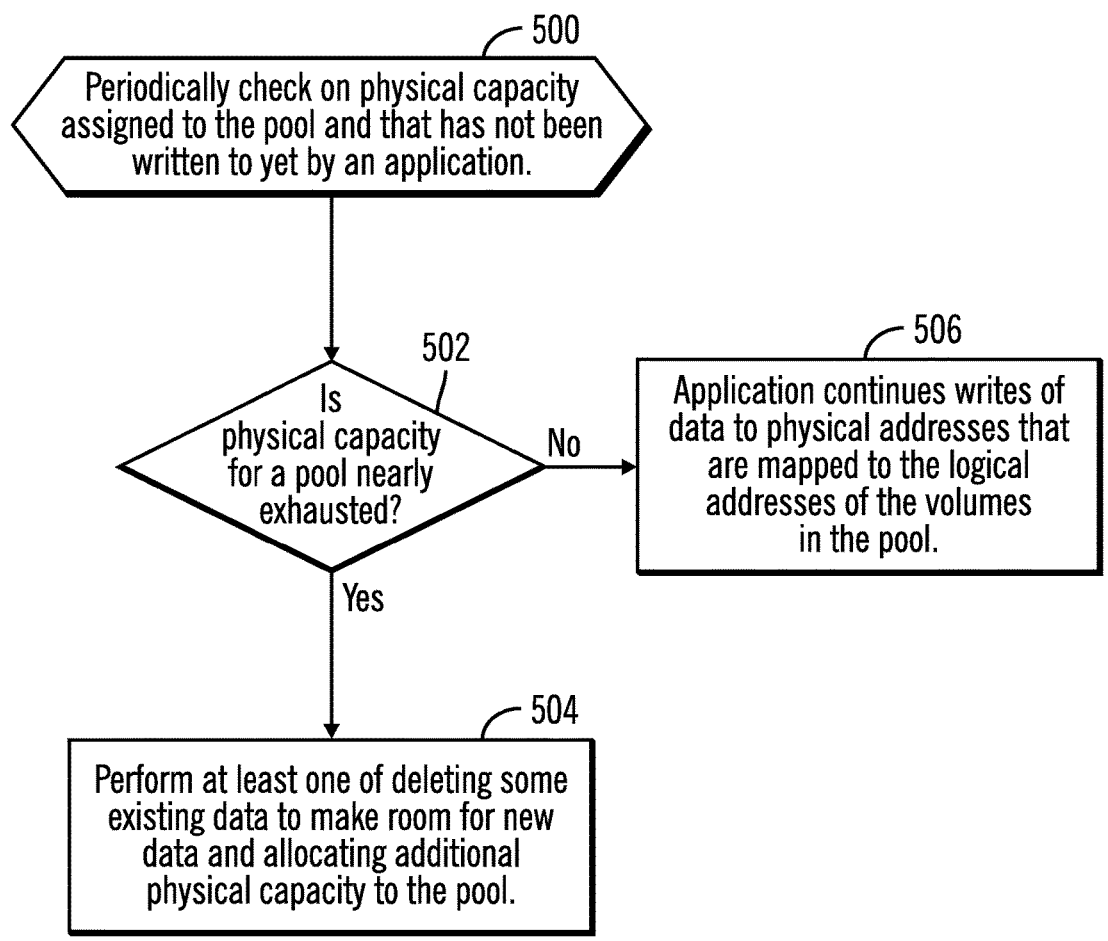
FIG. 5 illustrates, in a flow diagram, operations for managing physical capacity in accordance with certain embodiments.

FIG. 5 illustrates, in a flow diagram, operations for managing physical capacity in accordance with certain embodiments. Control begins at block 500 with the management interface 130 periodically checking on physical capacity assigned to the pool and that has not been written to yet by the application. In certain embodiments, the period checking is performed in response to system administrator or other user requests. In other embodiments, the periodic checking may be scheduled.

In block 502, the management interface 130 physical capacity for a pool is nearly exhausted. If so, processing continues to block 504, otherwise, processing continues to block 506. In certain embodiments, physical capacity for the pool is "nearly exhausted" if the amount of physical capacity that has been written to by the application exceeds a threshold. In certain embodiments, the test of block 502 is to determine whether all physical capacity has been exhausted (i.e., all used to by the application).

In block 504, the management interface 130 performs at least one of deleting some existing data to make room for new data and allocating additional physical capacity to the pool. In certain embodiments, the deletion and allocation may be in response to input from a system administrator or other user. This may include provisioning new storage devices to allocate the additional physical capacity. In yet other embodiments, the system administrator does nothing, and the result is that the application will no longer be able to write new data and will most likely fail.

In block 506, the application continues writes of data to physical addresses that are mapped to logical addresses of the volumes in the pool continue. That is, the write operation refers to logical addresses, and these are mapped to the physical addresses by the storage manager 120. In block 506, the storage manager 120 does nothing, and the application continues to write new data to the volumes by default.

Figure 6:
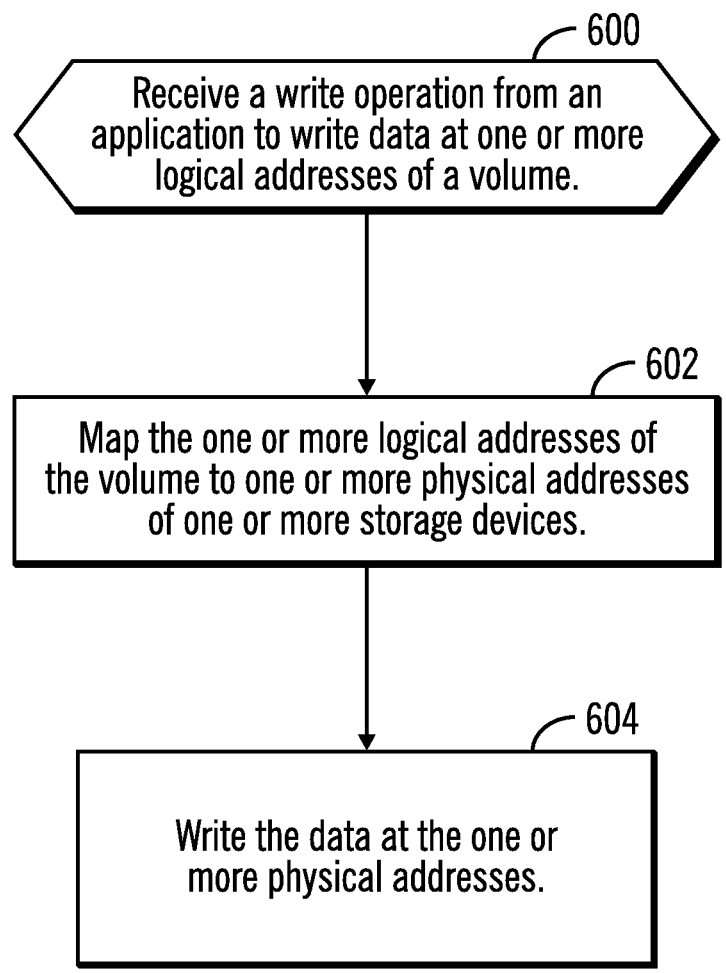
FIG. 6 illustrates, in a flow diagram, operations for writing data in accordance with certain embodiments.

FIG. 6 illustrates, in a flow diagram, operations for writing data in accordance with certain embodiments. Control begins at block 600 with the storage manager 120 receiving a write operation from an application 170 to write data at one or more logical addresses of a volume. In block 602, the storage manager 120 maps the one or more logical addresses of the volume to one or more physical addresses of one or more storage devices. In block 604, the storage manager 120 writes the data at the one or more physical addresses. The operations shown in blocks 600, 602, and 604 may be carried out in any combination as one operation or separately as separate operations (e.g., the operations of 600 and 602 may be carried out together, the operations of 602 and 604 may be carried out together, each of the operations may be carried out separately, etc.).

Figure 7:
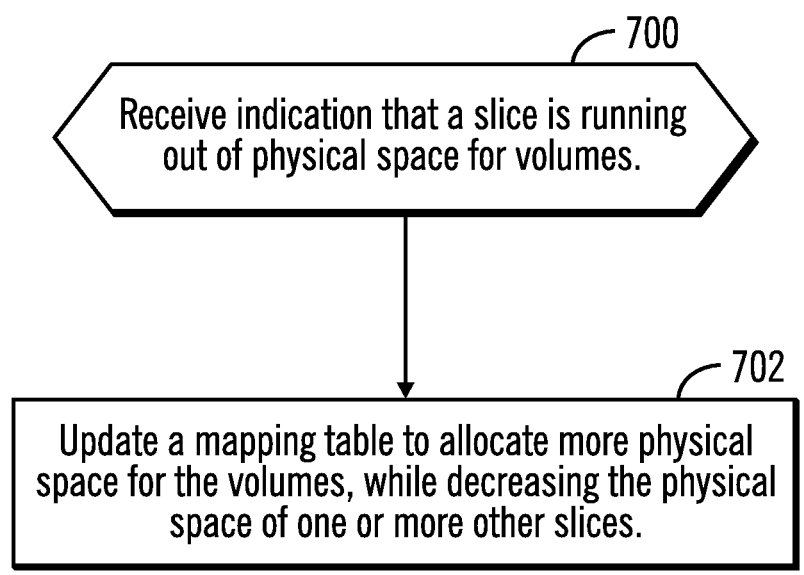
FIG. 7 illustrates, in a flow diagram, operations for changing a size of a slice in accordance with certain embodiments.

FIG. 7 illustrates, in a flow diagram, operations for changing a size of a slice in accordance with certain embodiments. Control begins at block 700 with the storage manager 120 receiving an indication that a slice is running out of physical space for volumes. In block 702, the storage manager 120 updates a mapping table to allocate more physical space for the volumes, while decreasing the physical space of one or more other slices. In certain embodiments, the slice may be increased to the size of a storage device (e.g., a single disk). In other embodiments, the slice may be increased to the size of all of the storage devices (e.g., all of the disks). Such allocation of slices is helpful in cases in which one slice stores a great deal of data in volumes, while another slice stores very little data in volumes.

In certain embodiments, when an application writes data to a volume, if the physical capacity allocated to the volume has been exhausted, the application is sent a notification that the write failed, and, in turn, the application may fail. Thus, there is management monitoring of the physical capacity in order to take corrective action when it nears exhaustion or is exhausted. This is the normal monitoring and managing functionality.

With embodiments, the physical capacity is checked periodically and data is deleted or additional physical capacity is allocated to avoid any failures. Thus, there is Input/Output (I/O) path handling of the case in which an I/O operation is failed due to physical capacity exhaustion. For example, this happens if the management had failed to resolve the issue before the capacity is completely exhausted and the application sends an I/O operation that the storage server cannot store.

Embodiments provide a virtual storage solution in which volumes allow unlimited or practically unlimited addressable space. This virtual storage solution simplifies many programming paradigms, just as virtual memory did. In certain embodiments, a new file system has unlimited addressable space, and so there is no need for garbage collection, and files may always be contiguous in the virtual storage space.

Storage blocks that are contiguous (have contiguous logical addresses) in the volume may or may not be contiguous on the storage devices. The placement of storage blocks on the storage devices depends on the specific data distribution of the storage controller 100 and on the data storage techniques. Therefore there is no easy way to predict the storage block location on the storage devices from logical addresses in the volume.

Embodiments separate the notion of addressable space in volumes from the physically available space in storage devices and allow the user to define volumes of virtually unlimited size.

Embodiments remove practical limitations on the size of configured volumes. The limitations are removed by ensuring that the storage manager 120 is designed so that the use of system resource, be it a data structure or an operation, is not a function of the size of the addressable volume space. For example, if the storage manager 120 uses a bit map (data structure) to store indicators about which storage blocks on the storage devices have been updated, this bit map is not a function of the size of the volume, but instead, is related to physical storage blocks allocated to the volume to contain the data the application had written to the volume (i.e., a bit in the bitmap represents a physical storage block and not a logical block). That is, by making sure that the data structures and operations of the storage manager 120 are not proportional to the addressable space of the volumes, embodiments avoid limiting the size of the volumes.

With embodiments, the actual use of storage volumes is still limited to the physical capacity the storage devise may store, and the storage manager 120 and application 170 using the storage may take actions to avoid exceeding this capacity. The management interface 130 provides tools that allow the storage manager 120 or the application 170 a way to keep track of the available physical capacity (storage space on the storage devices 140). In certain embodiments, a system administrator/user or the application 170 may use the management interface 130 to determine how much physical capacity is available and, if needed, delete data from one or more existing storage devices (to make room for new data) or provision (add) one or more new storage devices.

Embodiments support thin provisioning, but do not put a limit to the volume's addressable space, while adhering to the principle that no data structures or operations may be a function of the addressable space. However, the data structures and operations may be a function of the allocated physical capacity.

Embodiments provide a new paradigm that simplifies the use of volumes. For example, Log Structured Array (LSA) implementations may be forward only and may use simplified garbage collection or perhaps abandon garbage collection completely. That is LSA implementations with unlimited addressable space in a volume may write ahead without concern about running out of addressable space. With embodiments, the ability of the LSA implementation to write ahead does not require allocation of additional physical space because the writing ahead uses up virtual space. However, the LSA application tracks the physical space it uses, like any other application.

With embodiments, redundant backups of metadata structures may be stored at large fixed offsets without regard to the underlying storage space. The metadata data then stored persistently on one or more storage devices. By allocating an unlimited amount of addressable space to each of different types of metadata, there is no need to scale up to more addressable space.

With embodiments, extremely sparse utilization of the volume is as efficient as more compact management of the same, thus saving the application developer from any relocation or defragmentation of data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as a, b, c, used to designate a number of instances of an element may indicate a variable number of instances of that element when used with the same or different elements.

Figure 8:
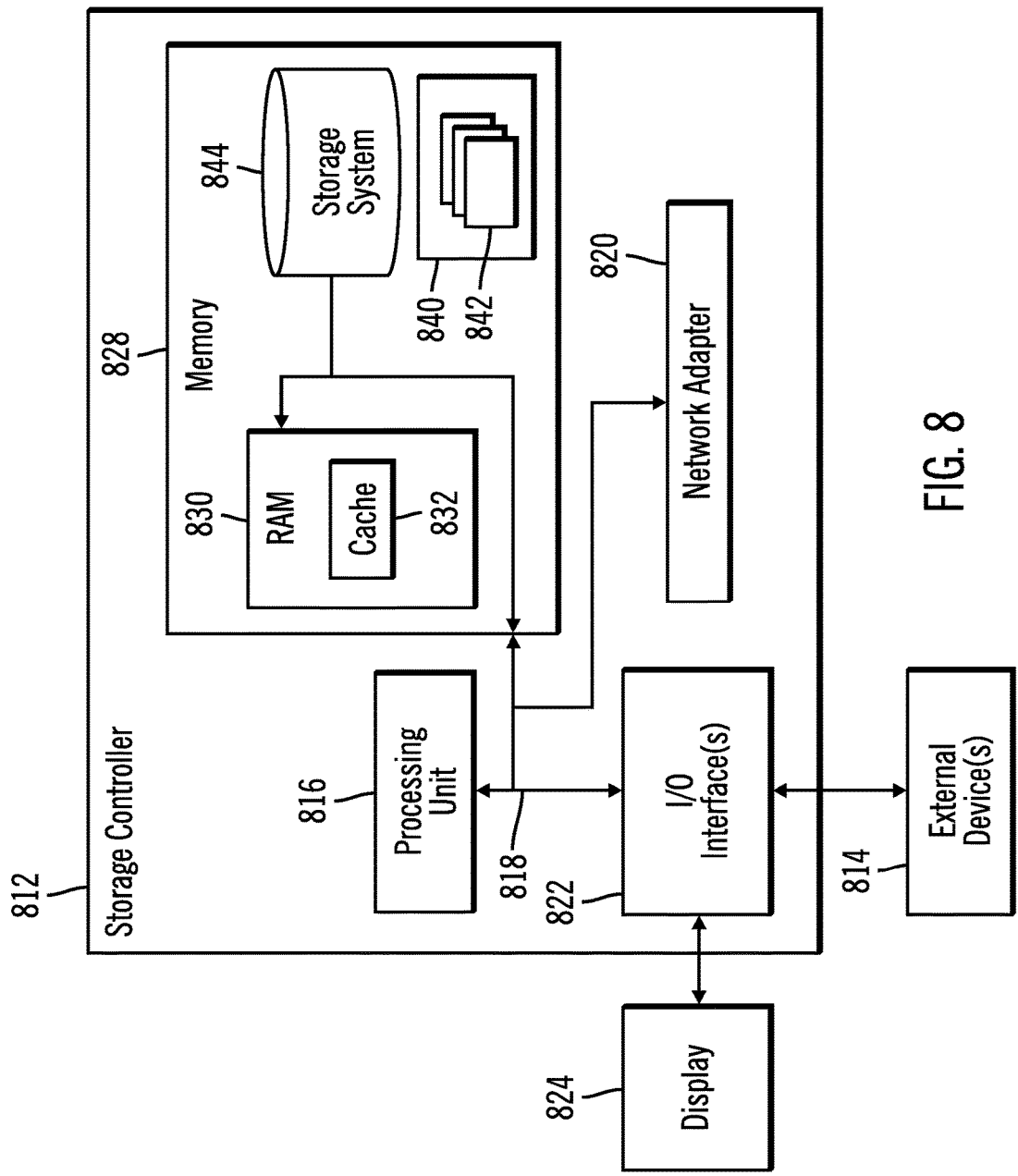
FIG. 8 illustrates how a storage controller may be implemented in accordance with certain embodiments.

The storage controller 100 of FIG. 1 may be implemented as storage controller 812 shown in FIG. 8. Computer system 812 may be described in the general context of computer system executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors or processing units 816, a system memory 828, and a bus 818 that couples various system components including system memory 828 to one or more processors or processing units 816. Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media.

System memory 828 can include computer system readable media in the form of volatile memory, such as random access memory (RAM) 830, which includes cache memory 832. Computer system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. The components of the computer system 812 may be implemented as program modules 842 which generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components may be used in conjunction with computer system 812. Examples, include, but are not limited to: microcode, device drivers, redundant processing units, external disk drive arrays, RAID systems, tape drives, and data archival storage systems, etc.

Figure 9:
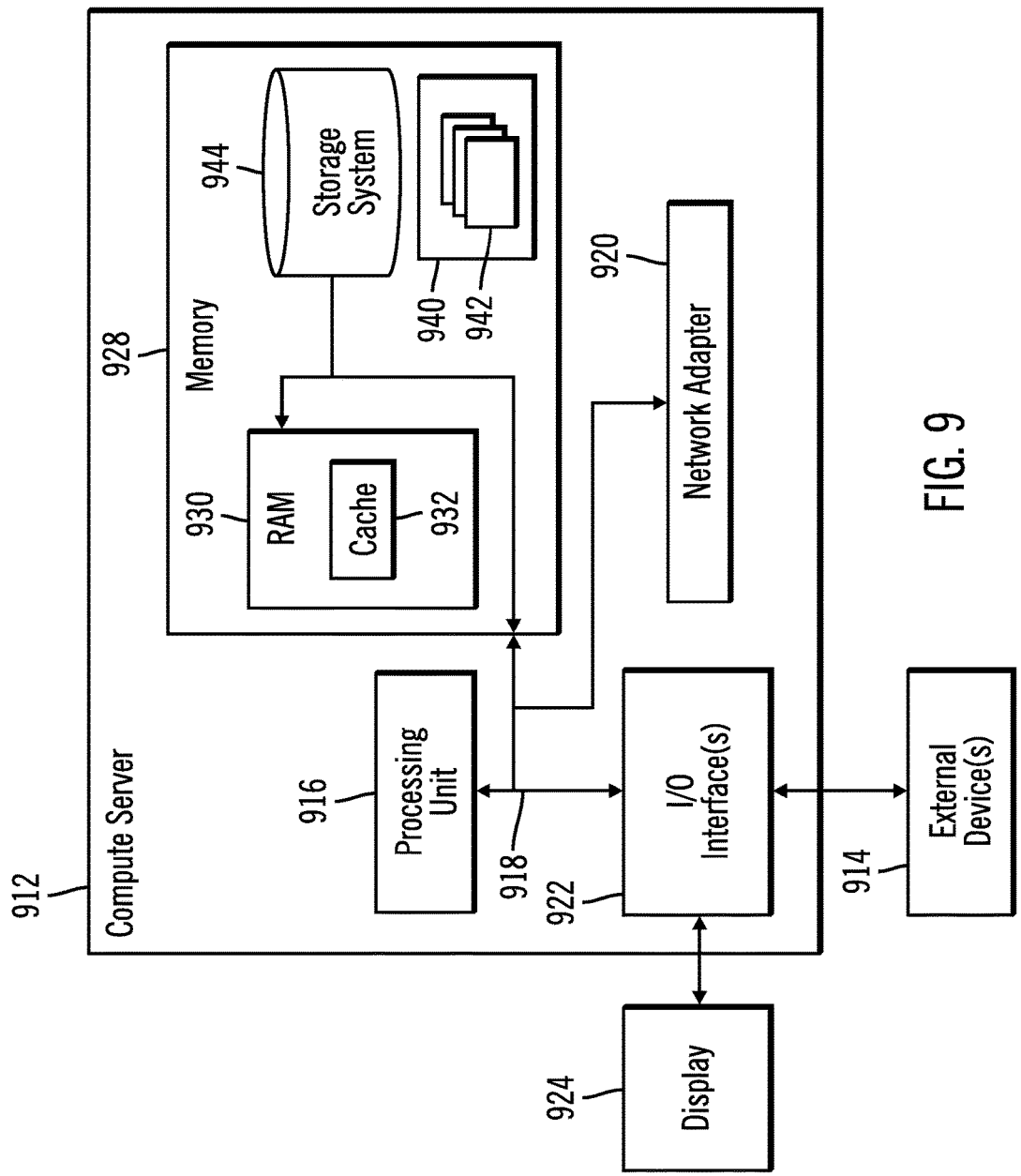
FIG. 9 illustrates how a compute server may be implemented in accordance with certain embodiments.

The compute server 160 of FIG. 1 may be implemented as compute server 912 shown in FIG. 9. Computer system 912 may be described in the general context of computer system executable instructions, such as program modules, being executed by a computer system. Generally, program modules may include routines, programs, objects, components, logic, data structures, and so on that perform particular tasks or implement particular abstract data types. Computer system 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system 912 is shown in the form of a general-purpose computing device. The components of computer system 912 may include, but are not limited to, one or more processors or processing units 916, a system memory 928, and a bus 918 that couples various system components including system memory 928 to one or more processors or processing units 916. Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 912 typically includes a variety of computer system readable media. Such media may be any available media that is accessible by computer system 912, and it includes both volatile and non-volatile media, removable and non-removable media.

System memory 928 can include computer system readable media in the form of volatile memory, such as random access memory (RAM) 930, which includes cache memory 932. Computer system 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. The components of the computer system 912 may be implemented as program modules 942 which generally carry out the functions and/or methodologies of embodiments of the invention as described herein.

Computer system 912 may also communicate with one or more external devices 914 such as a keyboard, a pointing device, a display 924, etc.; one or more devices that enable a user to interact with computer system 912; and/or any devices (e.g., network card, modem, etc.) that enable computer system 912 to communicate with one or more other computing devices. Such communication can occur via Input/Output (I/O) interfaces 922. Still yet, computer system 912 can communicate with one or more networks such as a local area network (LAN), a general wide area network (WAN), and/or a public network (e.g., the Internet) via network adapter 920. As depicted, network adapter 920 communicates with the other components of computer system 912 via bus 918. It should be understood that although not shown, other hardware and/or software components may be used in conjunction with computer system 912. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having computer readable program code embodied therein that executes to perform operations, the operations comprising:
   providing a plurality of slices, wherein each of the plurality of slices has partitions accessed with physical addresses;
   providing a pool, wherein the pool has volumes accessed with logical addresses;
   providing a mapping table that includes columns for a slice identifier, a partition identifier, and a volume identifier; and
   while data is being written to the volumes in the pool,
      allocating partitions of a first slice of the plurality of slices to the volumes in the pool; and
      in response to determining that the first slice needs additional physical capacity, allocating an unused partition of a second slice to the first slice by:
         identifying a row of the mapping table for the unused partition of the second slice; and
         updating the row of the mapping table by changing the slice identifier to an identifier of the first slice and changing the partition identifier to a new partition identifier for the first slice.

2. The computer program product of claim 1, wherein the computer readable program code embodied therein executes to perform operations, the operations comprising:
   allocating an amount of physical capacity to the pool; and
   provisioning one or more additional storage devices to allocate additional physical capacity to the pool.

3. The computer program product of claim 1, wherein the computer readable program code embodied therein executes to perform operations, the operations comprising:
   tracking an amount of physical capacity used by the pool; and
   providing a User Interface (UI) to receive requests to display the amount of physical capacity used by the pool.

4. The computer program product of claim 1, wherein garbage collection is not needed.

5. The computer program product of claim 1, wherein the plurality of slices are on storage devices, and wherein a data structure is used to store indicators about which physical storage blocks of the storage devices have been updated.

6. A computer system, comprising:
   one or more processors, one or more computer-readable memories and one or more computer-readable, tangible storage devices; and
   program instructions, stored on at least one of the one or more computer-readable, tangible storage devices for execution by at least one of the one or more processors via at least one of the one or more memories, to perform operations comprising:
      providing a plurality of slices, wherein each of the plurality of slices has partitions accessed with physical addresses;
      providing a pool, wherein the pool has volumes accessed with logical addresses;
      providing a mapping table that includes columns for a slice identifier, a partition identifier, and a volume identifier; and
      while data is being written to the volumes in the pool,
         allocating partitions of a first slice of the plurality of slices to the volumes in the pool; and
         in response to determining that the first slice needs additional physical capacity, allocating an unused partition of a second slice to the first slice by:
            identifying a row of the mapping table for the unused partition of the second slice; and
            updating the row of the mapping table by changing the slice identifier to an identifier of the first slice and changing the partition identifier to a new partition identifier for the first slice.

7. The computer system of claim 6, wherein the operations further comprise:
   allocating an amount of physical capacity to the pool; and
   provisioning one or more additional storage devices to allocate additional physical capacity to the pool.

8. The computer system of claim 6, wherein the operations further comprise:
   tracking an amount of physical capacity used by the pool; and
   providing a User Interface (UI) to receive requests to display the amount of physical capacity used by the pool.

9. The computer system of claim 6, wherein garbage collection is not needed.

10. The computer system of claim 6, wherein the plurality of slices are on storage devices, and wherein a data structure is used to store indicators about which physical storage blocks of the storage devices have been updated.

11. A method, comprising:
   providing a plurality of slices, wherein each of the plurality of slices has partitions accessed with physical addresses;
   providing a pool, wherein the pool has volumes accessed with logical addresses;
   providing a mapping table that includes columns for a slice identifier, a partition identifier, and a volume identifier; and
   while data is being written to the volumes in the pool,
      allocating partitions of a first slice of the plurality of slices to the volumes in the pool; and
      in response to determining that the first slice needs additional physical capacity, allocating an unused partition of a second slice to the first slice by:
         identifying a row of the mapping table for the unused partition of the second slice; and updating the row of the mapping table by changing the slice identifier to an identifier of the first slice and changing the partition identifier to a new partition identifier for the first slice.

12. The method of claim 11, further comprising:
allocating an amount of physical capacity to the pool; and
provisioning one or more additional storage devices to allocate additional physical capacity to the pool.

13. The method of claim 11, further comprising:
tracking an amount of physical capacity used by the pool; and
providing a User Interface (UI) to receive requests to display the amount of physical capacity used by the pool.

14. The method of claim 11, wherein garbage collection is not needed.

15. The method of claim 11, wherein the plurality of slices are on storage devices, and wherein a data structure is used to store indicators about which physical storage blocks of the storage devices have been updated.

* * * * *